United States Patent
Feigel et al.

(10) Patent No.: US 7,300,161 B2
(45) Date of Patent: Nov. 27, 2007

(54) PORTABLE LARGE SCALE PROJECTION DISPLAY SYSTEM

(75) Inventors: Roy Alan Feigel, Austin, TX (US); Barry Alan Feigenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/981,158

(22) Filed: Nov. 4, 2004

(65) Prior Publication Data

US 2006/0092387 A1     May 4, 2006

(51) Int. Cl.
*G03B 21/14* (2006.01)

(52) U.S. Cl. .......................... 353/94; 353/79
(58) Field of Classification Search ............ 353/30, 353/94, 79; 348/839, 840; 345/1.3
See application file for complete search history.

(56) References Cited

U.S. PATENT DOCUMENTS

| | | | | |
|---|---|---|---|---|
| 3,912,385 A * | 10/1975 | Stokes et al. ................. 353/94 |
| 5,206,760 A * | 4/1993 | Nakashima et al. .......... 359/457 |
| 5,382,990 A * | 1/1995 | Hata et al. ..................... 353/94 |
| 5,512,968 A * | 4/1996 | Hagiwara et al. .............. 353/94 |
| 5,796,443 A * | 8/1998 | Kawajiri et al. ............. 348/839 |
| 5,897,192 A * | 4/1999 | Seufert ......................... 353/74 |
| 5,902,030 A * | 5/1999 | Blanchard .................... 353/30 |
| 5,956,000 A * | 9/1999 | Kreitman et al. ............ 345/1.3 |
| 6,222,593 B1 * | 4/2001 | Higurashi et al. .......... 348/745 |
| 6,310,650 B1 * | 10/2001 | Johnson et al. ............. 348/383 |
| 6,490,011 B1 * | 12/2002 | Cooper et al. .............. 348/839 |
| 6,594,078 B2 * | 7/2003 | Clifton et al. ............... 359/449 |
| 6,698,901 B2 * | 3/2004 | Kobayashi et al. ........... 353/94 |
| 6,781,563 B2 * | 8/2004 | Nishio et al. ................ 345/1.1 |
| 7,025,466 B2 * | 4/2006 | Hoffmeister et al. ........ 353/119 |
| 7,131,733 B2 * | 11/2006 | Shibano ........................ 353/94 |
| 2003/0067587 A1 * | 4/2003 | Yamasaki et al. ............. 353/30 |
| 2005/0219467 A1 * | 10/2005 | Nomizo et al. ............... 353/30 |

OTHER PUBLICATIONS

Feigel, Roy Alan; Declaration of; in Connection with Supplemental Information Disclosure Statement; Aug. 17, 2005.

* cited by examiner

*Primary Examiner*—William C. Dowling
(74) *Attorney, Agent, or Firm*—Carr LLP; D'Ann N. Rifai

(57) ABSTRACT

The present invention is a portable, configurable, inexpensive large scale projection system. The system is comprised of a plurality of projectors mounted on a structure and a display screen. The structure can be reconfigured to hold more or fewer projectors, and can be disassembled for easy transportation and reassembled. In an embodiment, the structure is comprised of containers and the projectors are mounted on calibration tables.

20 Claims, 4 Drawing Sheets

PORTABLE LARGE SCALE PROJECTION DISPLAY SYSTEM

CROSS-REFERENCE TO RELATED APPLICATION

This application relates to a U.S. patent application Ser. No. 10/809,582 entitled "Wall-Sized Computer Display" filed Mar. 25, 2004.

TECHNICAL FIELD

The present invention relates generally to image projectors and, more particularly, to large scale projection display systems.

BACKGROUND

Large scale displays are computer displays an order of magnitude or more larger than standard computer displays, with the same density of pixels per unit area. They can be 3000 by 3000 pixels or more, instead of the approximately 1000 ×750 pixels of a standard display. Large scale displays are critical for the display of large images at high resolution. They enable a viewer to see an entire image at once, all at high resolution. With a standard display, the viewer can either view the entire image at low resolution, or view pieces at high resolution. Using a large scale display, a viewer may be able to comprehend a pattern that he could not comprehend using a standard display.

Large scale displays are also useful for the display of multiple sources of information. With a large scale display, there is room to display a variety of documents, e-mails, and other applications at the same time, without any window for an application obscuring another. It is then very easy to move from window to window, or to compare the contents of two windows. Finally, large scale displays are useful for conferences and other collaborative efforts. They provide a display large enough for several people to view simultaneously.

At present, there are serious drawbacks to large-scale arrays. They are constructed as a massive, fixed installation. They are difficult to transport, and it is not easy to change the size or configuration of the display. In addition, the displays are expensive. As a result, their availability is limited.

Therefore, there is a need for an inexpensive, reconfigurable large-scale display.

SUMMARY OF THE INVENTION

The present invention is a portable, reconfigurable, inexpensive large scale projection system. The system is comprised of a plurality of projectors connected to a structure and a display screen. The structure can be reconfigured to hold more or fewer projectors, and can be disassembled for easy transportation and reassembled.

BRIEF DESCRIPTION OF THE DRAWINGS

For a more complete understanding of the present invention and the advantages thereof, reference is now made to the following descriptions taken in conjunction with the accompanying drawing, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
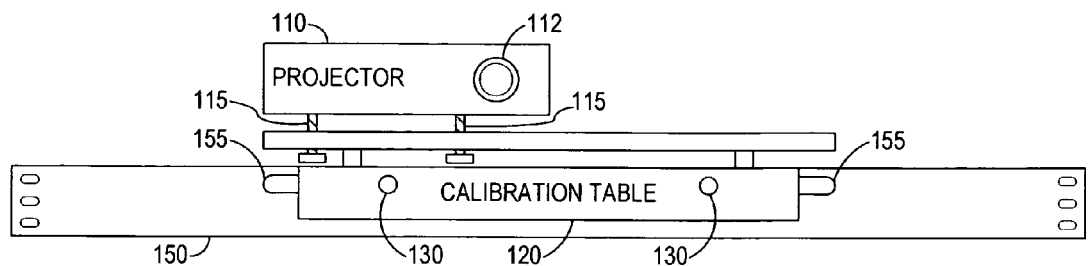
FIG. 1 shows a front view of the mounting of a single projector.

FIG. 1 shows a front view of the mounting of a single projector. A projector 110 is demountably attached to a calibration table 120 with clips 115. Images are projected through aperture 112 of the projector 110. The calibration table 120 is adjustable with six degrees of freedom: the three planar directions, front and back, left and right, up and down; and three rotations, roll, pitch and yaw. As a result, the projector 110 is also adjustable with six degrees of freedom. The calibration table 120 is fastened to a slot 155 of a mounting bracket 150 with suitable fasteners such as bolts 130. The calibration table can be adjusted left-to-right by its placement on the mounting bracket 150. In an embodiment of the invention, the calibration tables 150 are manufactured by Draper, Inc. of Spiceland, Ind.

Figure 2:
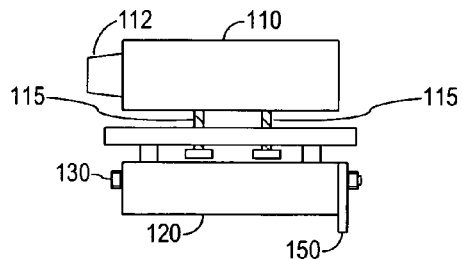
FIG. 2 shows a side view of the mounting of a single projector.

FIG. 2 shows a side view of the mounting of a single projector. It shows a bolt 130 going through the calibration table 120 and into the mounting bracket 150.

Figure 3:
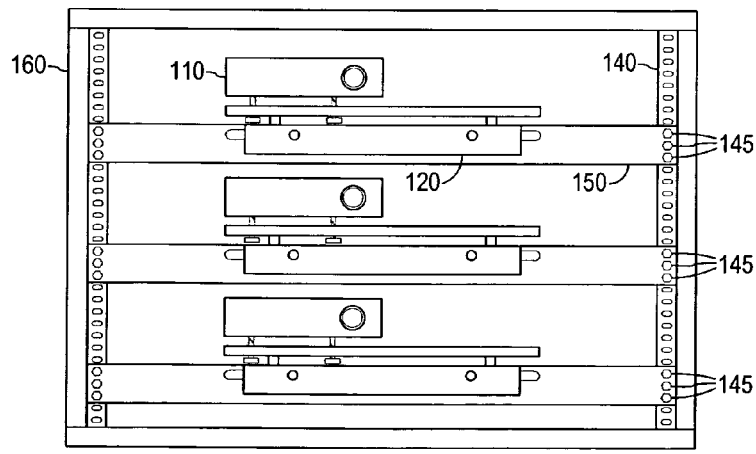
FIG. 3 shows the mounting of several projectors on a box.

FIG. 3 shows the mounting of several projectors in a container such as box 160. The mounting brackets 150 holding the calibration tables 120 are fastened to the sides of the box 160 with bolts 145 which are inserted into standard rack rails 140. The calibration tables 120 can be adjusted vertically by the placement of the mounting brackets 150 on the standard rack rails 140. In an embodiment of the invention, box 160 consists of a packing case made by Keal Cases of Round Rock, Tex.

Figure 4:
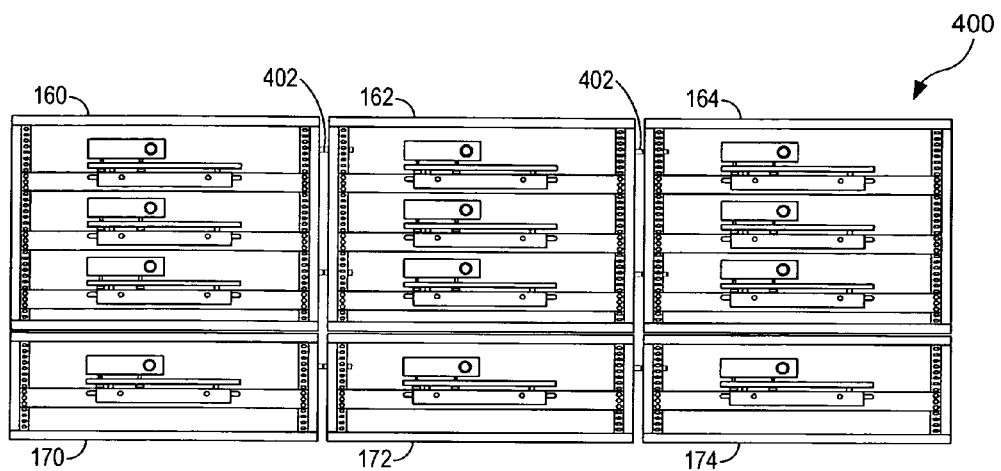
FIG. 4 shows an array of projectors.

FIG. 4 shows an array 400 of projectors 110. The columns of projectors 110 are formed by projectors 110 arranged vertically and mounted in a structure comprising containers such as boxes 160, 162, 164, 170, 172 and 174. In FIG. 4, two boxes 160 and 170 are stacked on top of each other. The bottom box 170 holds one projector 110 and the top box 160 holds 3 projectors 110. The rows of the array are formed by boxes 160, 162 and 164 arranged horizontally and by boxes 170, 172 and 174 arranged horizontally. The containers of each row are demountably attached to each other by suitable fasteners such as bolts 402. The horizontal placement of the rows can be adjusted by adjusting the width between the boxes.

Figure 5:
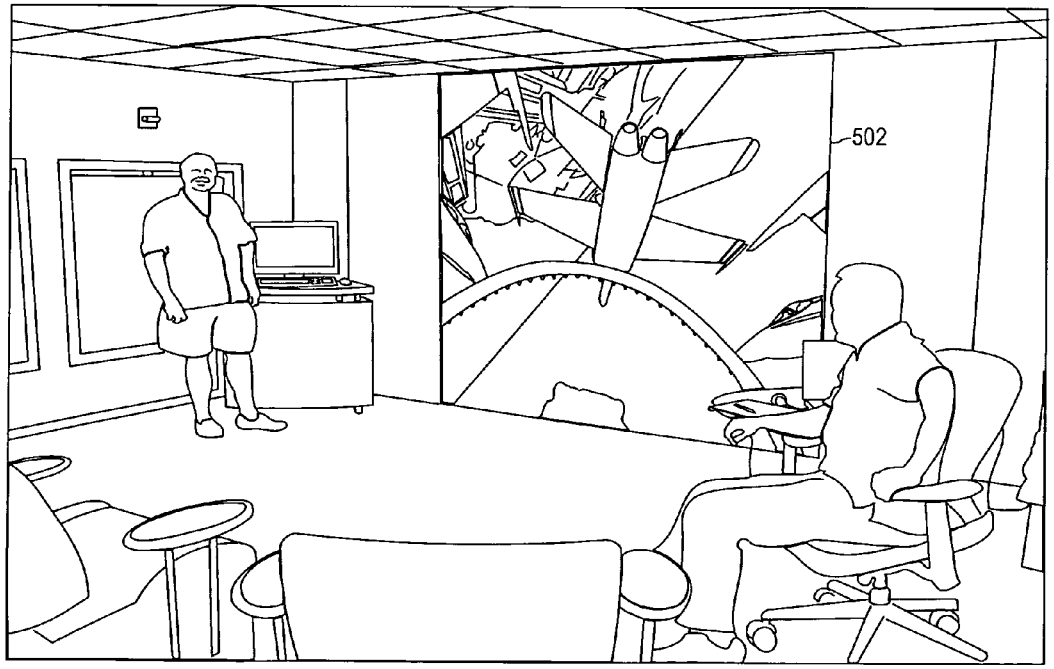
FIG. 5 shows the projection of images from multiple projectors on a screen.

FIG. 5 shows the projection of images from the array of projectors 110 onto a screen 502. As a result of the types and range of adjustments provided, the images from the individual projectors 110 are combined to form a near-seamless image with the image of each projector 110 hitting the display screen squarely, and with the images all aligned. The calibration tables 120 provide the fine adjustments with six degrees of freedom. Gross adjustments in the three axes are provided by the structure. Horizontal adjustments are provided by sliding the calibration tables 120 on the mounting brackets 155 and by moving the columns of boxes closer or farther apart. Vertical adjustments are provided by the vertical placement of the mounting brackets 150 on the standard rack rails. Forward and back adjustments are provided by sliding the whole array closer to or further from the screen.

The display is able to project all the way to the bottom of the display screen, by tilting the bottom-most projectors downward. This is difficult to achieve with conventional large scale displays. A standard projector is asymmetric. Its projection is level to the projector at the bottom, and angled up at the top. FIG. 5 depicts a scene in which the projection of images 502 fills a wall-sized display screen, which extends from floor-to-ceiling within a room.

Figure 6:
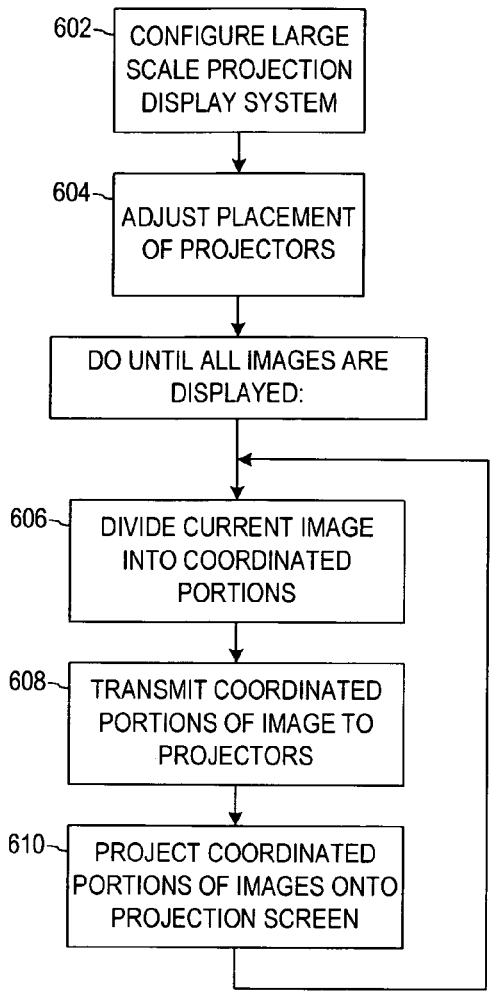
FIG. 6 shows a flow diagram of the display of an image with a portable large scale projection display system.

FIG. 6 is a flow diagram of the display of images with a portable large scale projection display system (system). The system can act like a giant computer monitor, displaying the images generated by a computer, and with the same refresh rate as a standard monitor. In step 602, the system is configured for the image and the screen. The number of rows or columns of boxes or the number of projectors within a box may be changed. In step 604, the projectors are adjusted so that the images projected by each combine into a seamless, unitary image. Then, the following steps are performed until all of the images are displayed:

In step 606, the current image is divided into coordinated portions;

In step 608, the coordinated portions are transmitted to the projectors; and

In step 610, the projectors project the coordinated portions onto the screen.

Because of the construction of the system, the projectors can be adjusted so that the coordinated portions shown on the screen line up nearly seamlessly and unite to produce the image being displayed.

Figure 7:
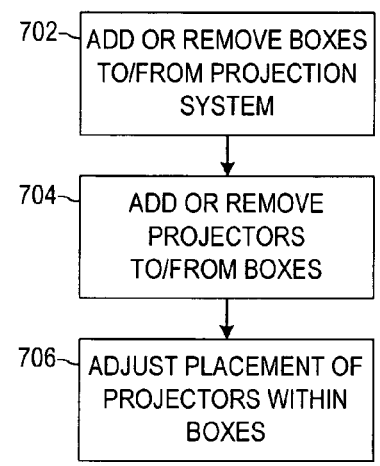
FIG. 7 shows a flow diagram of the reconfiguring of a portable large scale projection display system.

FIG. 7 is a flow diagram of the reconfiguring of a portable large scale projection display system. As a result of the construction, the structure of the array is rigid, yet reconfigurable. In step 702, boxes are added to or removed from the system. The components of the array are easy to take apart, reposition, and reassemble. The width can be modified by adding or subtracting columns of boxes, and the height can be modified by adding or subtracting boxes. In step 704, projectors are added or removed from the boxes. This changes the number of projectors in column. The combination of steps 702 and 704 changes the number of rows and columns in a projector array. For example, the array illustrated in FIG. 4 is 3 rows by 4 columns. The structure of the array can be reconfigured into a 3×3 array by removing the bottom row of boxes, or reconfigured into a 4×4 array by adding a fourth column of boxes. In step 706, after reconfiguring, the projectors are adjusted so that the separate images unite nearly seamlessly.

Figure 8:
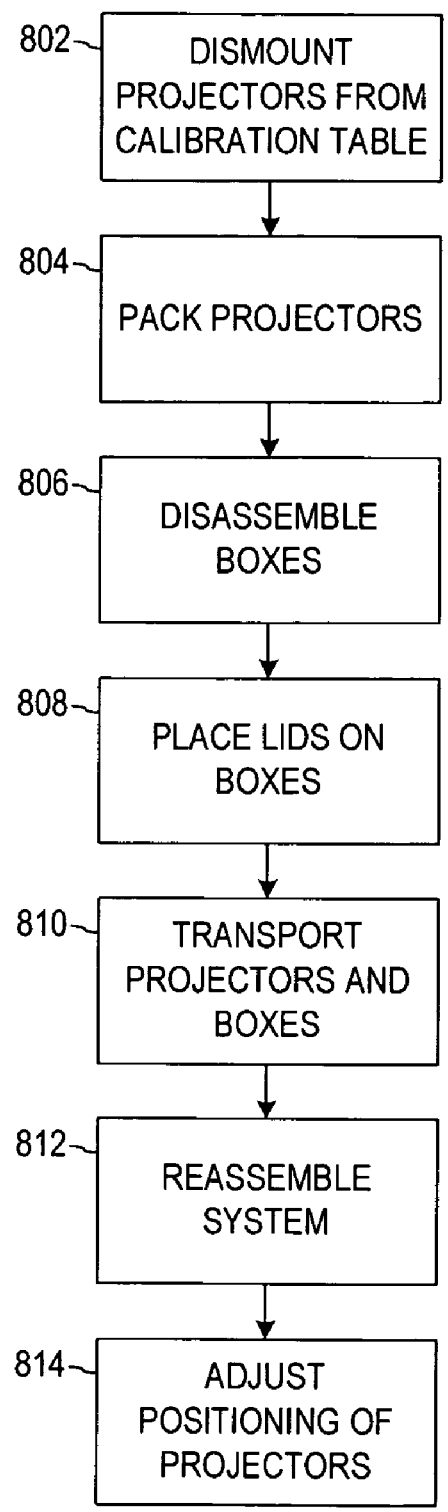
FIG. 8 shows a flow diagram of the transporting of a portable large scale projection display system.

FIG. 8 is a flow diagram of the transporting of a portable large scale projection display system. In step 802, the projectors 110 are dismounted from the calibration tables 120. In step 804, they are packed. In step 806, the boxes are disassembled by removing the bolts fastening them together. In step 808, the boxes are covered with lids. The boxes and calibration tables are durable, and can readily survive transportation. In step 810, the components are transported. A box holding three projectors just fits within an elevator. After transporting, in step 812, the system is reassembled. The boxes are fastened to each other and the projectors 110 are re-mounted to the calibration tables 120. In step 814, any necessary adjustment to the projectors is made so that the images of each combine nearly seamlessly. Because of the construction of the system, the process is easy. The parts are readily disassembled and reassembled, and the projectors are easy to adjust.

In addition, the display is inexpensive. The projectors 110 are far less expensive, even proportionately, than the much larger projectors used to make standard large scale displays. The structural elements, the boxes and mounting bars, are inexpensive, and the calibration tables 120 are not expensive.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A large scale projection display system, comprising:
   a container comprising mounting means;
   a plurality of mounting brackets each adapted for attachment to the mounting means;
   a plurality of calibration tables each adapted for attachment to one of the mounting brackets;
   a plurality of projectors;
   a screen;
   wherein in assembly the mounting brackets are attached to the mounting means, each of the calibration tables is attached to a corresponding one of the mounting brackets, and each of the projectors is attached to a different one of the calibration tables;
   wherein a position of each of the calibration tables with respect to the screen is adjustable via translation in each of three perpendicular planes;
   wherein an orientation of the calibration tables with respect to the screen is adjustable via rotation about three perpendicular axes; and
   wherein each of the projectors is configured to project a portion of an image onto the screen.

2. The large scale projection display system as recited in claim 1, wherein the container comprises a box.

3. The large scale projection display system as recited in claim 1, wherein the container comprises a front opening through which the projectors project the portions of the image onto the screen.

4. The large scale projection display system as recited in claim 3, further comprising a lid dimensioned to fit the front opening, wherein the container is suitable for transport following detachment of the projectors from the calibration tables and positioning of the lid on the front opening.

5. The large scale projection display system as recited in claim 1, wherein the mounting means comprises a pair of elongate rails.

6. The large scale projection display system as recited in claim 1, wherein in assembly the mounting brackets are removably attached to the mounting means.

7. The large scale projection display system as recited in claim 1, wherein in assembly each of the calibration tables is removably attached to the corresponding mounting bracket.

8. The large scale projection display system as recited in claim 1, wherein in assembly each of the projectors is removably attached to a different one of the calibration tables.

9. The large scale projection display system as recited in claim 1, wherein the mounting means comprises a pair of elongate rails positioned vertically on opposite sides of the container, and wherein each of the rails comprises a plurality of holes allowing adjustable vertical positioning of the mounting brackets within the container.

10. The large scale projection display system as recited in claim 9, wherein the holes in the rails allow translational positioning of the calibration tables with respect to the container in one of the three perpendicular planes.

11. The large scale projection display system as recited in claim 1, wherein each of the mounting brackets comprises a slot, and wherein each of the calibration tables is attached to the corresponding mounting bracket via the slot.

12. The large scale projection display system as recited in claim 11, wherein the slots in the mounting brackets provide for adjustable translational positioning of the calibration tables with respect to the container in one of the three perpendicular planes.

13. The large scale projection display system as recited in claim 1, wherein in assembly the projectors are either in horizontal alignment or in vertical alignment.

14. The large scale projection display system as recited in claim 1, wherein in assembly some of the projectors are in horizontal alignment and some of the projectors are in vertical alignment.

15. A large scale projection display system, comprising:
a plurality of containers each comprising mounting means;
a plurality of mounting brackets each adapted for attachment to the mounting means;
a plurality of calibration tables each adapted for attachment to one of the mounting brackets;
a plurality of projectors;
a screen;
wherein in assembly the mounting brackets are attached to the mounting means, each of the calibration tables is attached to a corresponding one of the mounting brackets, and each of the projectors is attached to a different one of the calibration tables;
wherein a position of each of the calibration tables with respect to the screen is adjustable via translation in each of three perpendicular planes;
wherein an orientation of the calibration tables with respect to the screen is adjustable via rotation about three perpendicular axes; and
wherein each of the projectors is configured to project a portion of an image onto the screen.

16. The large scale projection display system as recited in claim 15, wherein each of the containers comprises a box.

17. The large scale projection display system as recited in claim 15, wherein each of the containers comprises a front opening, and wherein the projectors project the portions of the image onto the screen through the front openings of the containers.

18. The large scale projection display system as recited in claim 17, further comprising a plurality of lids each dimensioned to fit the front opening of a corresponding one of the containers, wherein the containers are suitable for transport following detachment of the projectors from the calibration tables and positioning of the lids on the front openings of the corresponding containers.

19. The large scale projection display system as recited in claim 15, wherein the containers are adapted for attachment to one another.

20. The large scale projection display system as recited in claim 15, wherein in assembly the containers are removably attached to one another.

* * * * *